United States Patent
Tanaka et al.

(10) Patent No.: US 6,426,930 B2
(45) Date of Patent: Jul. 30, 2002

(54) INFORMATION RECORDING METHOD AND INFORMATION RECORDING APPARATUS THEREFOR

(75) Inventors: Tsutomu Tanaka; Masakazu Taguchi; Takuya Kamimura, all of Kawaski (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/774,155

(22) Filed: Jan. 30, 2001

(30) Foreign Application Priority Data

Jun. 23, 2000 (JP) ......................... 2000-189975

(51) Int. Cl.⁷ ............................................. G11B 5/76
(52) U.S. Cl. ................. 369/59.12; 369/47.28; 369/53.34
(58) Field of Search ................... 369/47.15, 47.23, 369/47.28, 53.31, 53.34, 53.44, 59.12, 59.2, 116

(56) References Cited

U.S. PATENT DOCUMENTS 6,236,635 B1 * 5/2001 Miyamoto et al. .......... 369/116

FOREIGN PATENT DOCUMENTS

| JP | 3-22223 | 1/1991 |
|----|---------|--------|
| JP | 6-76401 | 3/1994 |
| JP | 6-84224 | 3/1994 |
| JP | 7-244877 | 9/1995 |
| JP | 10-124950 | 5/1998 |

* cited by examiner

*Primary Examiner*—Paul W. Huber
(74) *Attorney, Agent, or Firm*—Greer, Burns & Crain

(57) ABSTRACT

An information recording method and an apparatus therefor, wherein a recording compensation controlling unit 1 receives data to be recorded and determines whether a pulse timing adjustment is to be performed or not, and instructs an APC 3 to adjust the timing thereby to advance the pulse start timing of laser light and/or to delay the pulse termination timing when the pulse timing adjustment is to be performed. The recording compensation controlling unit 1 determines the pulse timing adjustment corresponding to the presence or absence of a predetermined "space, record mark", whereby the positional shift quantity of leading and trailing edges is reduced even for the marks having a fine dimension, and the jitter is reduced.

19 Claims, 17 Drawing Sheets

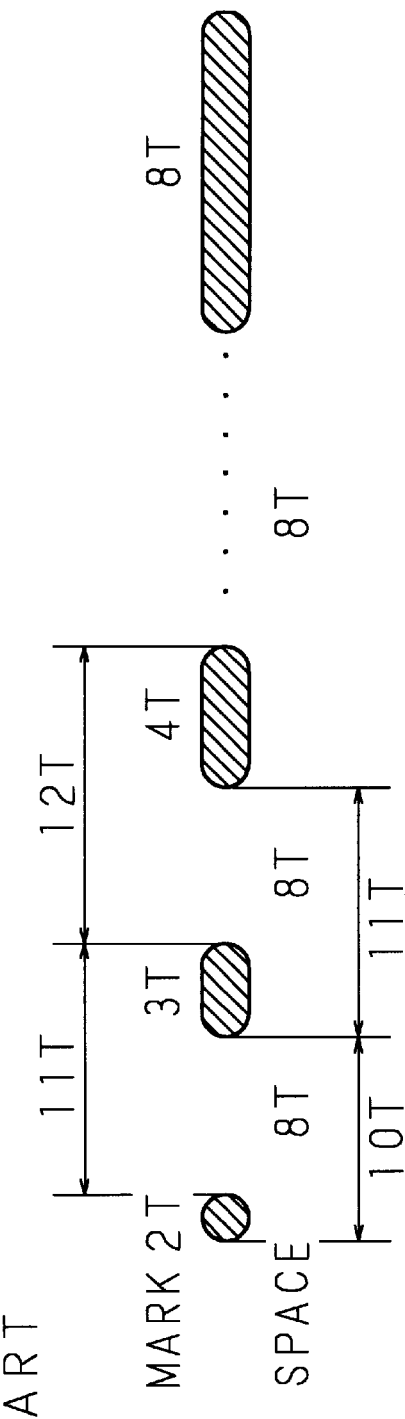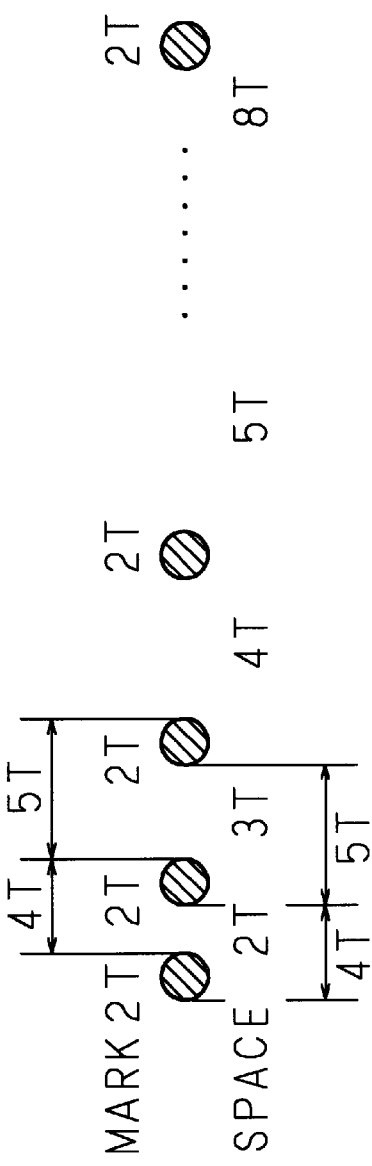
FIG. 3A PRIOR ART
FIG. 3B PRIOR ART

INFORMATION RECORDING METHOD AND INFORMATION RECORDING APPARATUS THEREFOR

BACKGROUND OF THE INVENTION

The present invention relates to an information recording method for forming a record mark on an optical recording medium by the heat of an optical beam and an information recording apparatus therefor, and in particular, to a method and an apparatus for recording information by a mark edge recording method.

BRIEF SUMMARY OF THE INVENTION

With the demand of increasing the informational density of optical recording media, a mark edge recording method has been used widely as a recording method in recent years. In the mark edge recording method, the edge of a record mark corresponds to "1" of binary informational data. This method is capable of recording information at a higher density than that of a mark position recording method, in which the presence and absence of a record mark correspond to "1" and "0", respectively.

In order to realize high density recording on an optical recording medium, it is important to secure the precision of the recording control in addition to usage of the mark edge recording method. In Japanese Patent Application Laid-Open No. 3-22223 (1991), the present assignee has proposed a control method and an apparatus therefor in which a signal of laser light irradiation for forming one record mark is pulsed whereby the length and the amplitude of the series of pulses for the next mark is adjusted depending on the length of the mark non-formed portion (space). In this control method, the shape distortion in the trailing edge of a mark due to the influence of the heat of the preceding mark can be corrected. However, there have still been unsolved problems of the shape distortion in the leading edge of the mark and of the shift of edge position.

A method for resolving the problem of the positional shift of a formed mark has been proposed in Japanese Patent Application Laid-Open No. 6-84224 (1994). The method is a multi-pulse recording method in which the power of laser light for forming a mark is pulsed by modulating into three values while the power of laser light for forming spaces is modulated into two values, and in which the length of the series of pulses is adjusted depending on the mark length. In this method, the amount of heat supply of the preceding mark is adjusted depending on the length thereof, whereby the positional shift of the next mark formation is prevented. However, there has been a problem that the influence of heat caused by the length of the preceding space can not be avoided.

Further, a recording method and a recording apparatus for maintaining the constancy of the positional shift quantity of a record mark edge has been proposed in Japanese Patent Application Laid-Open No. 6-76401 (1994). In the method, the shorter preceding space causes the later timing of the next light emission, and the longer record mark causes the earlier timing of the light extinction. However, there has been a problem of incapability of recording compensation corresponding to various combinations of the mark length and the space length of a data signal.

FIG. 1 and FIG. 2 are timing charts showing a record waveform together with the data to be recorded in accordance with a prior art. FIG. 1 shows a multi-pulse record waveform in accordance with Japanese Patent Application Laid-Open No. 6-84224 (1994), where the power of laser light for forming marks is modulated into three values of Pa, Pw1, and Pw2, while the power of laser light for forming spaces is modulated into two values of Pa and Pr. The number of irradiated pulses sequentially increases correspondingly to record marks 2T, 3T, . . . , 8T of (1, 7) RLL modulation coding. The region from the rise point to the fall point of data to be recorded corresponds to a record mark. The timing of pulse termination of each record mark is earlier by "T/2" than the timing of the fall of data to be recorded. This comes from the consideration that the trailing edge of a record mark expands rearward due to the influence of heat.

In a magneto-optical disk having record marks formed by the record waveform shown in FIG. 1, the shift quantity was measured for the leading and trailing edges of the record marks. The measurement has shown a large shift quantity for short marks. Further, the measurement of random jitter for leading and trailing edges has shown the jitter of 11.2% for leading edges, 12.1% for trailing edges, and 11.7% in average. Both the jitters of leading and trailing edges exceed the jitter tolerance of 10%. It has been also found that the jitter substantially increases with decreasing shortest length of record marks. Here, in the measurement of random jitter, the standard deviation of the time difference between the edge of a record mark and the edge of a reference clock signal is detected and expressed by the ratio to the reference clock.

FIG. 2 shows a multi-pulse record waveform proposed by the present assignee. In this method, the power of laser light for forming marks is modulated into four values of Pa, Pw1, Pw2, and Pw3, while the power of laser light for forming spaces is modulated into two values of Pa and Pb. The number of pulses sequentially increases correspondingly to each record mark 2T, 3T, . . . , 8T of (1, 7) RLL modulation coding. The timing of pulse termination of each record mark is earlier than the timing of the fall of data to be recorded similarly to FIG. 1.

In a magneto-optical disk having record marks formed by such a record waveform, the shift quantity was measured for the leading and trailing edges of the record marks. The measurement has shown that the shift quantity is reduced in comparison with that by the record waveform shown in FIG. 1. That is, the measured random jitter for leading and trailing edges are 11.4% for leading edges, 10.5% for trailing edges, and 11.0% in average. The jitter of trailing edges is decreased in comparison with that by the record waveform shown in FIG. 1, however, the jitter values exceed the jitter tolerance.

As such, in the formation of record marks having various lengths such as 2T through 8T, there has been a limit in controlling the edge shift of each record mark only by adjusting the number of pulses and the power of laser. Further, the jitter substantially increases with decreasing shortest length of record marks. In particular, in a magnetic super-resolution medium capable of reproducing record marks having a dimension smaller than the beam spot, for example, a dimension of 0.4 μm or less, there bas been a problem of a high jitter due to the positional shift of record marks.

The present invention has been devised considering such problems. An object of the invention is to provide an information recording apparatus and an information recording method in which the pulse start timing and/or the pulse termination timing of beam light are adjusted during the recording of those permutational combinations of a space of a predetermined length and a mark of a predetermined length, whereby the positional shift quantity of leading and trailing edges is reduced even for the marks having a dimension of 0.4 μm or less, whereby the jitter is reduced.

The present assignee has obtained the following findings from the evaluation of edge shift for respective permutational combinations of spaces and marks recorded by the multi-pulse recording method described above (see FIG. 2). For the evaluation of edge shift, the edge shift quantity was measured for both the marks recorded in a pattern-shift pattern shown in FIG. 3A and the marks recorded in a thermal shift pattern shown in FIG. 3B. FIG. 3A and FIG. 3B are diagrams showing the record mark length and the space distance for the measurement of pattern shift and thermal shift. In the pattern-shift pattern, the space distance is kept constant and the record mark length is varied as shown in FIG. 3A. Using this pattern, the influence of the heat of record mark formation over the trailing edge of the record mark can be observed.

FIG. 4 is a graph showing the shift quantity in the length for each conventional mark recorded in the pattern-shift pattern. The (1, 7) RLL modulation code was used, and 2T through 8T marks were recorded on a magneto-optical disk capable of recording in both land and groove. The space distance was constant 8T. The axis of ordinate indicates the shift quantity (nsec.), and the axis of abscissa indicates the length of recorded marks (×T). In the measurement, the time corresponding to the formed length of a record mark is measured by a time interval analyzer, and the difference from the correct time of each record mark with the reference to the time of the shortest length mark is obtained as the shift quantity. That is, the shift quantity indicates the positional shift of a recorded mark from the correct position. Here, the shortest record mark is a 2T mark in case of (1, 7) RLL modulation code. The positive direction of the axis of ordinate indicates a longer mark, and the negative direction indicates a shorter mark.

FIG. 5 is a graph showing the shift quantity of leading and trailing edges for each conventional mark similarly recorded in the pattern-shift pattern. The axis of ordinate indicates the shift quantity (nsec.), and the axis of abscissa indicates the distance (channel clock length) between the leading edges of two consecutive marks or between the trailing edges of two consecutive marks. In the figure, the mark "Δ" indicates that of leading edges, and the mark "□" indicates that of trailing edges. The positive direction of the axis of ordinate indicates a forward shift quantity, and the negative direction indicates a rearward shift quantity.

FIG. 4 shows that 3T marks are shorter than the correct length. Further, FIG. 5 shows that the leading edges of 3T marks are in the correct position (that is, the shift quantity between the leading edges of 11T in the axis of abscissa is nearly zero). These facts show that the trailing edges of 3T marks are shifted forward. This implies that the heat is insufficient for forming 3T marks. The result is the same not only for the case of a constant space length of 8T but also for any case from 2T through 7T. That is, the trailing edges of 3T marks are shifted forward, and the length is shortened regardless of the preceding space length, which implies that the heat is insufficient for forming 3T marks.

Next, the shift quantity was evaluated for the spaces between record marks recorded by the thermal shift pattern. In the thermal shift pattern, the record mark length is kept constant, and the space distance is varied as shown in FIG. 3B. Using this pattern, the influence of the preheating in space distances over the leading edge of the next record mark can be observed. FIG. 6 is a graph showing the shift quantity of the space length between conventional marks recorded in the thermal shift pattern. The (1, 7) RLL modulation code was used, and constant marks with a space distance of 2T through 8T were recorded on a magneto-optical disk capable of recording in both land and groove. The mark length was constant 2T. The axis of ordinate indicates the shift quantity (nsec.), and the axis of abscissa indicates the length of recorded spaces (×T).

FIG. 7 is a graph showing the shift quantity of leading and trailing edges for each conventional mark similarly recorded in the thermal shift pattern. The axis of ordinate indicates the shift quantity (nsec.), and the axis of abscissa indicates the channel clock length between the leading edges of two consecutive marks or between the trailing edges of two consecutive marks. In the figure, the mark "Δ" indicates that of leading edges, and the mark "□" indicates that of trailing edges. The positive direction of the axis of ordinate indicates a forward shift quantity, and the negative direction indicates a rearward shift quantity.

FIG. 6 shows that 2T spaces are longer than the correct length. Further, FIG. 7 shows that the shift quantity between the leading edges at 5T in the axis of abscissa is shifted rearward, and FIG. 6 shows that the shift quantity of 3T spaces is nearly zero. These facts show that the leading edge of a mark following a 2T space is shifted rearward. This implies that the heat of preheating in 2T space portions is insufficient thereby causing the insufficiency of heat at the starting point of the next mark formation. The result is the same not only for the case of a constant mark length of 2T but also for any case of a record mark length from 3T through 8T. That is, the trailing edges of 2T spaces or the leading edges of the marks following a 2T space are shifted rearward regardless of the following mark length.

An information recording method in accordance with a first invention is characterized by comprising the following steps: determining the presence or absence of a permutational combination of a space of a predetermined length and a record mark of a predetermined length of inputted data to be recorded representing the record marks and the spaces to be formed; instructing to, when the determination result is the absence of said predetermined permutational combination, perform the start of the first pulse for forming the objective record mark at a start timing set correspondingly to the timing of switching to the record mark of said data to be recorded, and to perform the termination of the last pulse for forming said record mark at a termination timing set correspondingly to the timing of switching to the space of said data to be recorded; instructing, when the determination result is the presence of said predetermined permutational combination, timing the adjustment of advancing the start of the first pulse for forming a record mark of said predetermined length than said start timing and/or the adjustment of delaying the termination of the last pulse for forming the record mark of said predetermined length than said termination; and controlling the pulse timing of beam light from a light source in response to said instruction and thereby forming a record mark on said optical recording medium.

An information recording apparatus in accordance with a fourth invention is characterized by comprising: a determining unit for inputting data to be recorded representing the record marks and the spaces to be formed, and for determining the presence or absence of a permutational combination of a space of a predetermined length and a record mark of a predetermined length; an instructing unit for, when the determination result by said determining unit is the absence of said predetermined permutational combination, instructing to perform the start of the first pulse for forming the objective record mark at a start timing set correspondingly to the timing of switching to the record mark of said data to be recorded, and to perform the termination of the last pulse for forming said record mark at a termination timing set correspondingly to the timing of switching to the space of said data to be recorded; a timing adjustment instructing unit for, when the determination result by said determining unit is the presence of said predetermined permutational combination, instructing the adjustment of advancing the start of the first pulse for forming a record mark of said predetermined length than said start timing and/or the adjustment of delaying the termination of the last pulse for forming the record mark of said predetermined length than said termination timing; a light source capable of emitting pulsed beam light; and a beam light controlling unit for controlling the pulse timing of beam light from said light source in response to the instruction from said timing adjustment instructing unit.

In the first and the fourth inventions, when the data to be recorded contains a permutational combination of "space, record mark" previously expected to cause a large shift quantity, in order to reduce the shift quantity of the record mark, the start timing of pulse is advanced for a record mark the leading portion of which is expected to shift rearward, and the termination timing of pulse is delayed for a record mark the trailing portion of which is expected to shift forward, whereby the shift quantity is reduced and the jitter is reduced.

An information recording method in accordance with a second invention is characterized by a method of the first invention, wherein the presence or absence of said permutational combination including a shortest length space is determined in said determining step, and said method further comprising the step of instructing the adjustment of advancing the start of the first pulse for forming the objective record mark than said start timing when the determination result is the presence.

An information recording apparatus in accordance with a fifth invention is characterized by an apparatus of the fourth invention, said determining unit determines the presence or absence of said permutational combination including a shortest length space, and said timing adjustment instructing unit instructs the adjustment of advancing the start of the first pulse for forming the objective record mark than said start timing when the determination result by said determining unit is the presence.

In the second and the fifth inventions, when a record mark of any length is recorded after a shortest length space, the start of the first pulse for forming the record mark is advanced than said start timing. As described above, the present assignee has found that an nT record mark after a 2T space of the conventional (1, 7) RLL modulation code has a leading edge shifted rearward. Accordingly, the start of the first pulse of the objective record mark is advanced than the start timing of other record marks, whereby the shift quantity of record marks is reduced and the jitter is reduced.

An information recording method in accordance with a third invention is characterized by a method of the first or the second invention, wherein the presence or absence of said permutational combination including a record mark of a length requiring two pulses is determined in said determining step, and said method further comprising the step of instructing the adjustment of delaying the termination of the second pulse for forming the objective record mark than said termination timing when the determination result is the presence.

An information recording apparatus in accordance with a sixth invention is characterized by an apparatus of the fourth or the fifth invention, said determining unit determines the presence or absence of said permutational combination including a record mark of a length requiring two pulses, and said timing adjustment instructing unit instructs the adjustment of delaying the termination of the second pulse for forming the objective record mark than said termination timing when the determination result by said determining unit is the presence.

In the third and the sixth inventions, when a record mark requiring two pulses is recorded after a space of any length, the termination of the second pulse for forming the record mark is delayed than said termination timing. As described above, the present assignee has found that a 3T record mark after an nT space of the conventional (1, 7) RLL modulation code has a trailing edge shifted forward. Accordingly, the termination of the second pulse of the objective record mark is delayed than the termination timing of other record marks, whereby the shift quantity of record marks is reduced and the jitter is reduced.

An information recording apparatus in accordance with a seventh invention is characterized by an apparatus of the fifth invention, wherein said data to be recorded is (1, 7) RLL modulation code, and the shortest length space is a 2T space (where T is a unit period).

An information recording apparatus in accordance with an eighth invention is characterized by an apparatus of the sixth invention, wherein said data to be recorded is (1, 7) RLL modulation code, and the record mark of a length requiring two pulses is a 3T mark (where T is a unit period).

In the seventh and the eighth inventions, the information is recorded using (1, 7) RLL modulation code. The termination timing of the last pulse of a record mark (of any length) formed after a 2T space is delayed, whereby the jitter is reduced. Further, the start timing of the first pulse of a 3T mark following a space of any length is advanced, whereby the jitter is reduced.

An information recording apparatus in accordance with a ninth invention is characterized by an apparatus of any one of the fourth to the eighth inventions, wherein the start timing of said first pulse and the termination timing of said last pulse are set depending on a unit period defining the length of record marks and spaces to be formed, and the timing adjustment amount is set independently of said unit period.

In the ninth invention, the termination timing of the last pulse is set to be earlier, for example, by "T/2", than the timing of switching of the data to be recorded, and the amount of timing adjustment of the last pulse of a 3T mark is delayed within a range of 0.4 through 2.8 nsec. than said termination timing. Here, T is the unit period. As such, the start timing and termination timing of a pulse are set depending on the unit period, but the amount of timing adjustment can be set to be an identical value independent of the change in unit period.

An information recording apparatus in accordance with a tenth invention is characterized by an apparatus of any one of the fourth to the ninth inventions, wherein said beam light controlling unit is further capable of controlling the beam light power and thereby modulates the power value for forming the record marks and spaces.

In the tenth invention, the beam light controlling unit can control the beam light power and thereby modulates the pulses for forming of record marks and spaces into four or five values. Accordingly, the shift quantity of record marks having different length is further reduced and the jitter is reduced.

Further, although the jitter tends to occur in a magnetic super-resolution medium on which record marks having a dimension smaller than the spot size of the beam light, the jitter can be reduced by adjusting the pulse timing when the predetermined permutational combinations of "space, record mark" is recorded, as described above.

The above and further objects and features of the invention will more fully be apparent from the following detailed description with accompanying drawings.

BRIEF DESCRIPTION OF THE SEVERAL VIEWS OF THE DRAWINGS

FIG. 3A and FIG. 3B are diagrams showing the record mark length and the space distance for measuring pattern shift and thermal shift;

DETAILED DESCRIPTION OF THE INVENTION

The present invention is described below in detail with reference to the drawings showing an embodiment.

Figure 8:
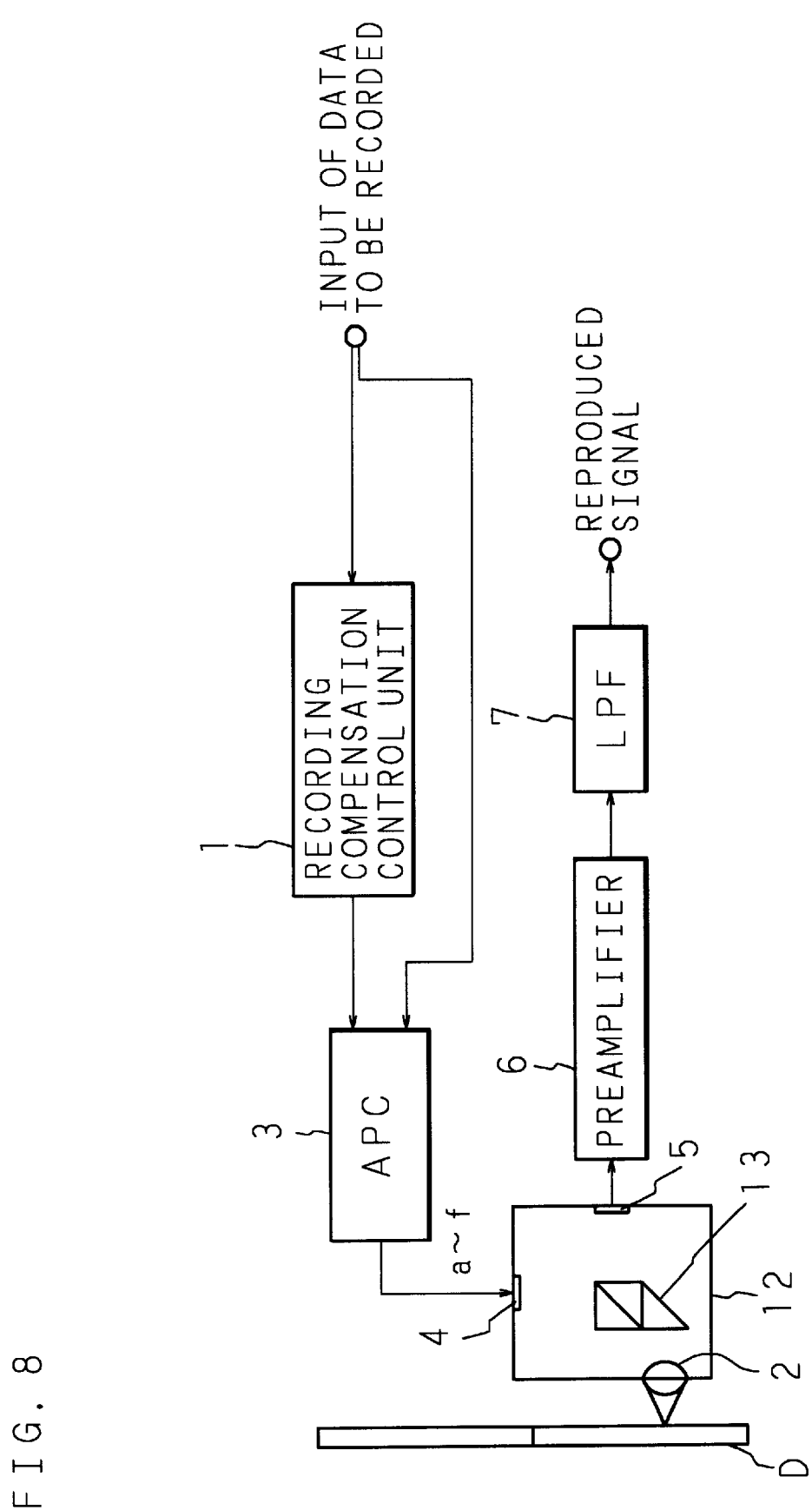
FIG. 8 is a block diagram showing a configuration of a recording and reproducing apparatus in accordance with the invention.

FIG. 8 is a block diagram showing a configuration of a recording and reproducing apparatus in accordance with the invention. In the figure, D designates a magneto-optical disk having a stacked film configuration described later. The disk is disposed facing to an optical head unit 12. Encoded data to be recorded is inputted through an input terminal into both a recording compensation controlling unit 1 and an APC (automatic laser power controlling mechanism) 3, which are a feature of the invention. The APC 3 is a controlling mechanism for controlling the power of the laser light emitted from the optical head unit 12, and outputs signals a through f, depending on the inputted data, to an LD (laser diode) circuit 4. Accordingly, the laser light is pulsed and emitted from the optical head unit 12. The recording compensation controlling unit 1 determines whether the recording compensation is to be carried out or not depending on the input of the data to be recorded, and instructs to the APC 3 whether the pulse start timing and the pulse termination timing of the laser light are to be adjusted or not. The process procedure after the input of the data to be recorded to the recording compensation controlling unit 1 is described later.

Figure 9:
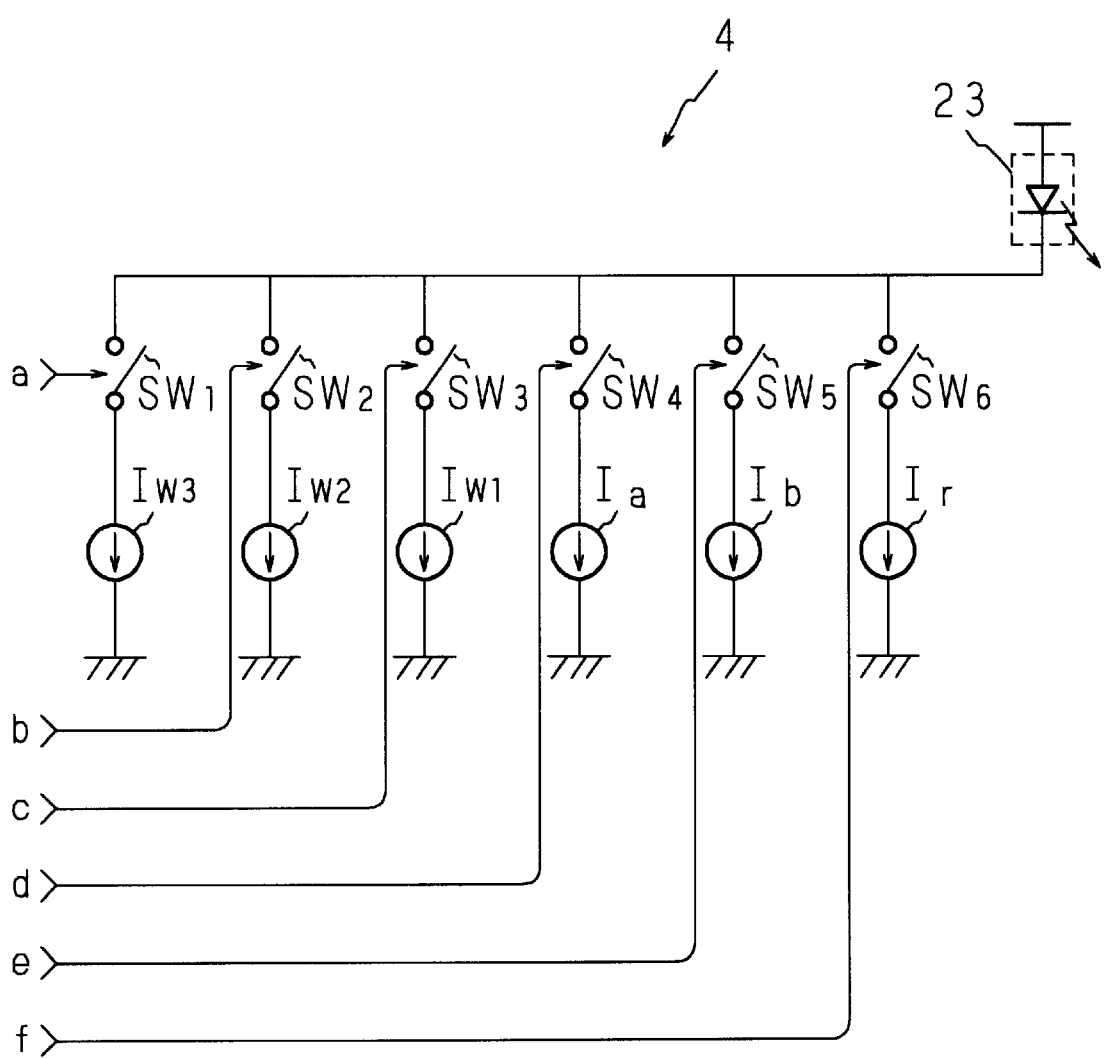
FIG. 9 is a circuit diagram showing a configuration of the LD circuit shown in FIG. 8.

FIG. 9 is a circuit diagram showing the configuration of the LD circuit 4 shown in FIG. 8. The LD circuit 4 comprises a semiconductor laser light source 23 and a controlling circuit thereof, and emits the laser light of a predetermined power value from the semiconductor laser light source 23 in response to an inputted signal. As shown in FIG. 9, the controlling circuit of the semiconductor laser light source 23 is constituted of first to sixth constant current sources $Iw_3$, $Iw_2$, $Iw_1$, Ia, Ib, Ir, and first to sixth switches $SW_1$, $SW_2$, $SW_3$, $SW_4$, $SW_5$, $SW_6$ connected between each constant current source and the semiconductor laser light source 23. Each of the first to sixth switches $SW_1$ through $SW_6$ supplies/interrupts the current from each of the first to sixth constant current sources $Iw_3$, $Iw_2$, $Iw_1$, Ia, Ib, Ir to the semiconductor laser light source 23, depending on the on/off thereof. The on/off of each of the first to sixth switches $SW_1$ through $SW_6$ is controlled by each of the inputted signals a through f outputted by the APC 3.

That is, the first constant current source $Iw_3$ supplies the current of a set value to the semiconductor laser light source 23 when the first switch $SW_1$ is closed by the signal a. The second constant current source $Iw_2$ supplies the current of a set value to the semiconductor laser light source 23 when the second switch $SW_2$ is closed by the signal b. Similarly, each of the third to the sixth constant current sources $Iw_1$, Ia, Ib, Ir supplies the current of a set value to the semiconductor laser light source 23 when the third to the sixth switches $SW_3$ through $SW_6$ is closed by each of the signals c through f. The total current supplied to the semiconductor laser light source 23 is the sum of the currents of a set value supplied by the first to sixth constant current sources $Iw_3$, $Iw_2$, $Iw_1$, Ia, Ib, Ir.

Figure 10:
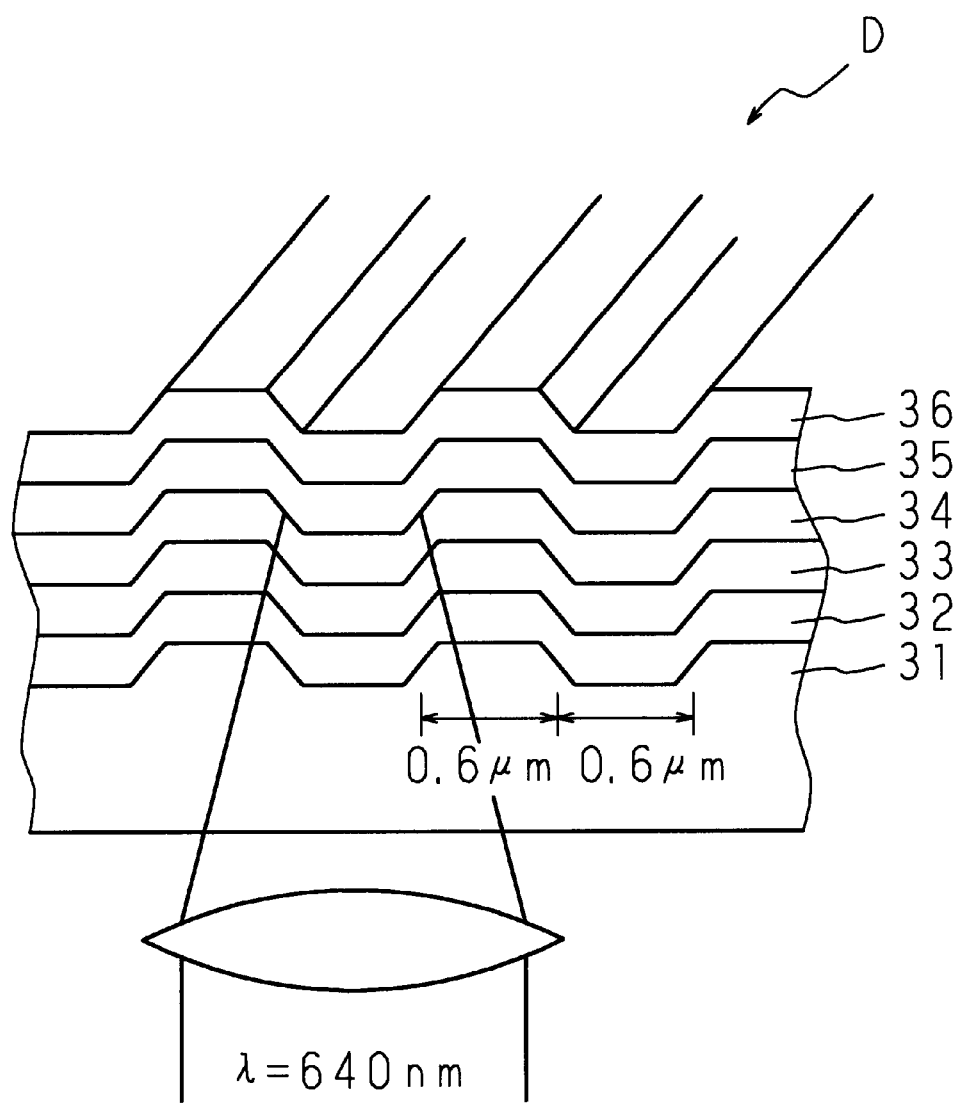
FIG. 10 is a film configuration diagram of a magneto-optical disk to which a method of the invention is applied.

The laser light pulsed by the LD circuit 4 having such a configuration is irradiated onto the magneto-optical disk D via an optical mechanism 13 and an objective lens 2 both provided in the optical head unit 12, whereby the data to be recorded of (1, 7) RLL modulation code is recorded on the magneto-optical disk D in a mark edge recording method. A multi-pulse method is used, in which one record mark is formed by the irradiation of one or a plurality of pulse. During above process, the magneto-optical disk D is revolved at a constant velocity of 7.5 m/s by a motor not shown. The shortest length mark 2T of (1, 7) RLL modulation code is set to be 0.30 μm, the wavelength of laser light is 640 nm, and the NA (numerical aperture) of the objective lens of the optical mechanism 13 is 0.55. FIG. 10 is a film configuration diagram of a magneto-optical disk to which a method of the invention is applied. In the magneto-optical disk D shown in FIG. 10, a dielectric layer 32, a reproduction layer 33, an intermediate layer 34, a recording layer 35, and a protection layer 36 are stacked on a substrate 31 having land and groove of 0.6 μm pitch each and capable of land/groove recording. The magneto-optical disk D has a film configuration, for example, of an MSR (Magnetically induced Super-Resolution) medium shown in Japanese Patent Application Laid-Open No. 7-244877 (1995) proposed by the present assignee. This film configuration permits the reproduction of record marks formed in a dimension smaller than the beam spot size, on the magneto-optical disk D.

The reproduction layer 33 consists of a rare earth-transition metal amorphous alloy film, and has an axis of easy magnetization in the vertical direction (stacked direction). The intermediate layer 34 consists of a rare earth-transition metal amorphous alloy film, and has an axis of easy magnetization in plane at room temperature (10 through 35° C.). The direction of the axis of easy magnetization changes from the in-plane direction to the vertical direction when the laser light irradiation raises the temperature to a predetermined temperature. Further, the recording layer 35 consists of a rare earth-transition metal amorphous alloy film, and has an axis of easy magnetization in the vertical direction. An example of the film materials and the film thickness is shown below.

Substrate 31: polycarbonate

Dielectric layer 32: SiN, 70 nm

Reproduction layer 33: GdFeCo (rare-earth magnetization dominant), 40 nm

Intermediate layer 34: GdFeCo (rare-earth magnetization dominant), 40 nm

Recording layer 35: TbFeCo (transition-metal magnetization dominant), 50 nm

Protection layer 36: SiN, 90 nm

It should be noted that the film material of each magnetic layer is not restricted to this. However, when the Curie temperatures of the reproduction layer 33, intermediate layer 34, and recording layer 35 are expressed by Tc1, Tc2, and Tc3, respectively, a necessary condition is Tc2<Tc1 and Tc2<Tc3. Further, when the coercive forces of the reproduction layer 33 and recording layer 35 are expressed by Hc1 and Hc3, respectively, another necessary condition is Hc1<Hc3.

At the reproduction of the data recorded on the magneto-optical disk D, as shown in FIG. 8, the laser light for reproduction is irradiated from the optical head unit 12 onto the magneto-optical disk D. The reflected light is incident through the optical mechanism 13 onto a PD (photo-diode) circuit 5, and then converted to an electric signal to be inputted to a preamplifier 6. The reproduced signal amplified by the preamplifier 6 is inputted to an LPF (low-pass filter) 7 thereby to eliminate the noise in high frequency range, and then outputted from an output terminal.

Figure 11:
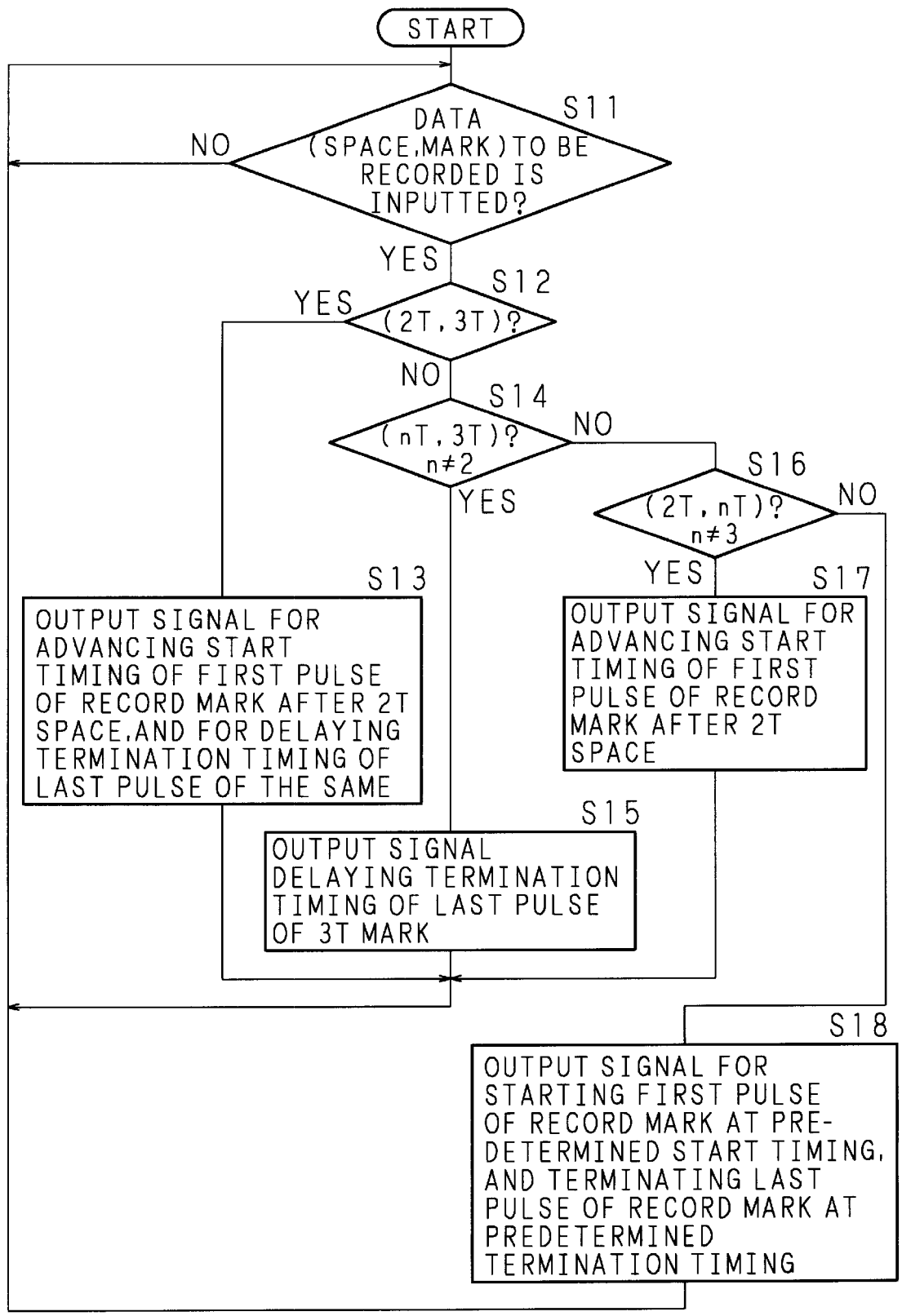
FIG. 11 is a flow chart showing the process procedure of the recording compensation controlling unit of the recording and reproducing apparatus shown in FIG. 8.

Described below is the procedure of recording compensation during the recording of (1, 7) RLL modulation code on both the land and groove of the magneto-optical disk D by using the recording and reproducing apparatus described above. FIG. 11 is a flow chart showing the process procedure of the recording compensation controlling unit 1 shown in FIG. 8. When the data to be recorded is inputted through the input terminal to both the recording compensation controlling unit 1 and the APC 3, the permutational combination of the data to be recorded is recognized first. Here, the permutational combination of the data to be recorded is a combination of a space length and a mark length to be recorded, and expressed by "space, mark". For example, a combination "2T, 2T" indicates a space of a 2T length followed by a mark of a 2T length.

Here, T is a clock (unit) period. When the data to be recorded is inputted (step S11), the recording compensation controlling unit 1 determines whether the data is one of "2T, 3T", "nT, 3T (n≠2)" and "2T, nT (n≠3)" or not. Here, nT indicates one of 2T through 8T of (1, 7) RLL modulation code, and n is an integer.

When the permutational combination of the data to be recorded is not any one of "2T, 3T", "nT, 3T (n≠2)" and "2T, nT (n≠3)" (steps S12 through S16), a signal instructing to perform the start of the first pulse of the laser light for forming the objective record mark at a predetermined start timing (referred to as the standard start timing hereafter) previously set in the APC 3 and a signal instructing to perform the termination of the last pulse of the laser light for forming the objective record mark at a predetermined termination timing (referred to as the standard termination timing hereafter) previously set in the APC 3 are outputted to the APC 3 (step S18). After that, the next data to be recorded is under the determination.

When the inputted data to be recorded is found to be "2T, 3T" (step S12), a timing adjustment signal instructing to advance the start of the first pulse of the laser light for forming the 3T mark after the 2T space than the above-mentioned standard start timing and a timing adjustment signal instructing to delay the termination of the last pulse of the laser light for forming the 3T mark than the above-mentioned standard termination timing are outputted to the APC 3 (step S13). The amount of timing adjustment in this case is, for example, 4 nsec. That is, the start timing is advanced by 4 nsec. (the amount of compensation: +4 nsec.) than the standard start timing, and the termination timing is delayed by 4 nsec. (the amount of compensation: −4 nsec.) than the standard termination timing. The amount of timing adjustment is not restricted to 4 nsec. The amount of timing adjustment may be set previously in the APC 3 or set previously in the recording compensation controlling unit 1. After that, the next data to be recorded is under the determination.

When the inputted data to be recorded is found to be "nT, 3T (n≠2)" by the recording compensation controlling unit 1 (step S14), a timing adjustment signal instructing to perform the start of the first pulse of the laser light for forming the 3T mark after the nT space at said standard start timing and to delay the termination of the last pulse of the laser light for forming the 3T mark than said standard termination timing is outputted to the APC 3 (step S15). After that, the determination is repeated for the subsequent data to be recorded.

When the inputted data to be recorded is found to be "2T, nT (n≠3)" by the recording compensation controlling unit 1 (step S16), a timing adjustment signal instructing to advance the start of the first pulse of the laser light for forming the nT mark after the 2T space than said standard start timing and to perform the termination of the last pulse of the laser light for forming the nT mark at said standard termination timing is outputted to the APC 3 (step S17). After that, the determination is repeated for the subsequent data to be recorded.

The APC 3 receives such signals and data to be recorded described above from the recording compensation controlling unit 1, and controls the laser light depending on the instruction of standard pulse timing or adjusted pulse timing. In the present embodiment, the above-mentioned standard start timing is set to be the same timing as the timing of switching of the binary information, while the standard termination timing is set to be earlier by "T/2" than the timing of switching of the binary information. The standard timing being set may be the same for all the record marks, or may be different for each mark of a different length. In that case, in the adjustment of start timing, the timing is advanced than the earliest timing of the plurality of start timings being set. In the adjustment of termination timing, the timing is delayed than the latest timing.

Figure 12:
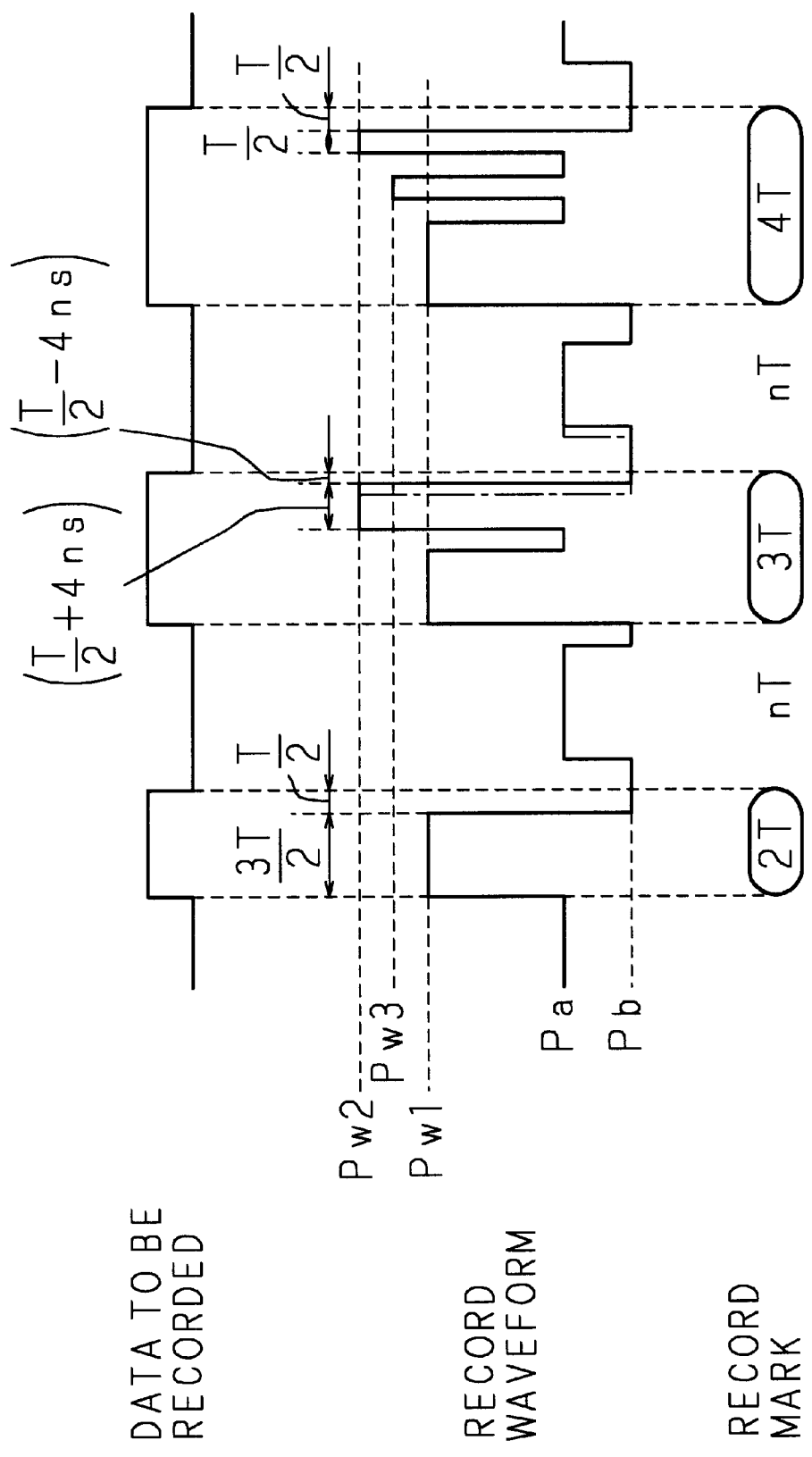
FIG. 12 is a diagram showing a record waveform by a multi-pulse recording method in accordance with an embodiment of the invention and record marks for measuring the pattern shift.
Figure 13:
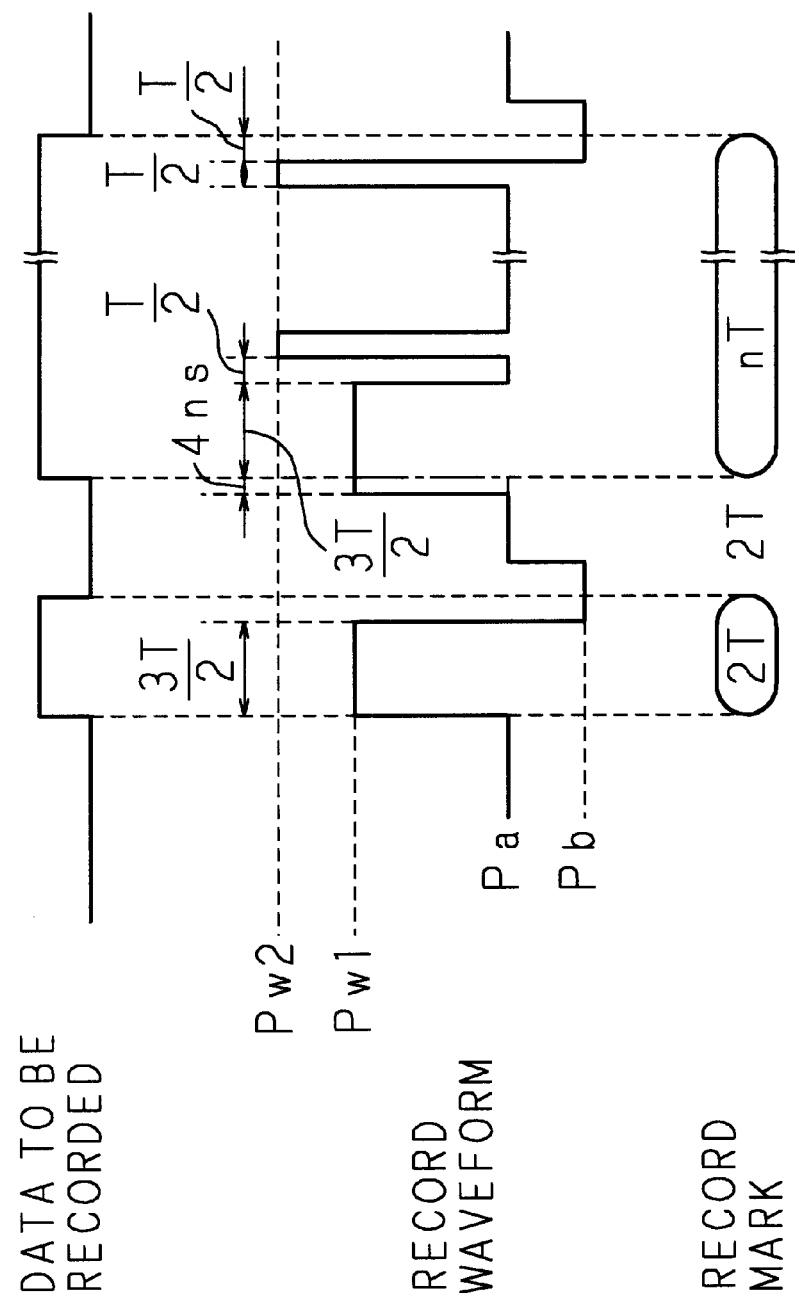
FIG. 13 is a diagram showing a record waveform by a multi-pulse recording method in accordance with an embodiment of the invention and record marks for measuring the thermal shift.

A detailed method of laser power control and recording compensation control is described below. FIG. 12 and FIG. 13 are diagrams showing a record waveform and record marks by a multi-pulse recording method in accordance with the present embodiment. FIG. 12 shows the case in which record marks are formed in order to measure the pattern shift using a five-value laser power modulation method. FIG. 13 shows the case in which record marks are formed in order to measure the thermal shift using a four-value laser power modulation method. The four-value laser power modulation method and the five-value laser power modulation method are described in Japanese Patent Application Laid-Open No. 10-124950 (1998) proposed by the present assignee, and hence the description is omitted. It should be noted that a similar result of recording compensation control is obtained even when the pattern shift is measured using four-value modulation and the thermal shift is measured using five-value modulation.

In the shift measurement shown in FIG. 12, the data to be recorded is a 2T mark, an nT space (n≠2), a 3T mark, an nT space (n≠2), a 4T mark, . . . . That is, "nT, 3T (n≠2)" is contained. In the forming portion of the 2T mark, a pulse starts at the same time as the rise of data to be recorded. The laser light of a first main heating power value Pw1 irradiates during a time duration of "3T/2", and the pulse is then terminated. After that, the laser light of a bottom power value Pb irradiates during a time duration of "T/2". In the next nT space portion, the laser light of the bottom power value Pb irradiates during the following time duration of "T/2". After that, the laser light of a pre-heating power value Pa irradiates until "T/2" before the next rise of data to be recorded, and the laser light of the power value Pb irradiates during the time duration of "T/2" until the rise.

In the forming portion of the record mark of a 3T mark length, depending on the process of the step S15 (see FIG. 11), a first pulse starts at the same time as the rise of data to be recorded (standard start timing). The laser light of a first main heating power value Pw1 irradiates during a time duration of "3T/2", and the laser light of a pre-heating power value Pa then irradiates during a time duration of "T/2". Then, depending on the process of the step S15 (see FIG. 11), the laser light of a second main heating power value Pw2 irradiates during a time duration of "T/2+4 nsec.", and the second (last) pulse is then terminated (adjustment of a 4-nsec. delay than the standard termination timing). The laser light of the bottom power value Pb then irradiates during the time duration of "T/2−4 nsec." until the rise. In the next nT space portion, the laser light of the bottom power value Pb irradiates during the following time duration of "T/2+4 nsec.". After that, the laser light of the pre-heating power value Pa irradiates until "T/2" before the next rise of data to be recorded, and the laser light of the power value Pb irradiates during the time duration of "T/2" until the rise.

In the shift measurement shown in FIG. 13, the data to be recorded is a 2T mark, a 2T space, an nT mark (n≠3), . . . . That is, "2T, nT (n≠3)" is contained. In the formation of the 2T mark, a pulse starts at the same time as the rise of data to be recorded. The laser light of a first main heating power value Pw1 irradiates during a time duration of "3T/2", and the pulse is then terminated. After that, the laser light of the bottom power value Pb irradiates during a time duration of "T/2". In the next 2T space portion, the laser light of a bottom power value Pb irradiates during the following time duration of "T/2". After that, depending on the process of the step S17 (see FIG. 11), the laser light of a pre-heating power value Pa irradiates until 4 nsec. before the next rise of data to be recorded, and the laser light of the main heating power value Pw1 irradiates during the time duration of 4 nsec. until the rise (adjustment of a 4-nsec. advance than the standard start timing).

In the forming portion of the record mark of an nT mark length, the laser light of the first main heating power value Pw1 irradiates during the following time duration of "3T/2", and the laser light of a pre-heating power value Pa then irradiates during a time duration of "T/2". After that, the laser light of a second main heating power value Pw2 irradiates during a time duration of "T/2", and this irradiation is repeated according to the value of n. After that, depending on the process of the step S17 (see FIG. 11), the laser light of the second main heating power value Pw2 irradiates during a time duration of "T/2", and the last pulse is then terminated (standard termination timing). The laser light of a bottom power value Pb then irradiates during the time duration of "T/2" until the rise.

Figure 1:
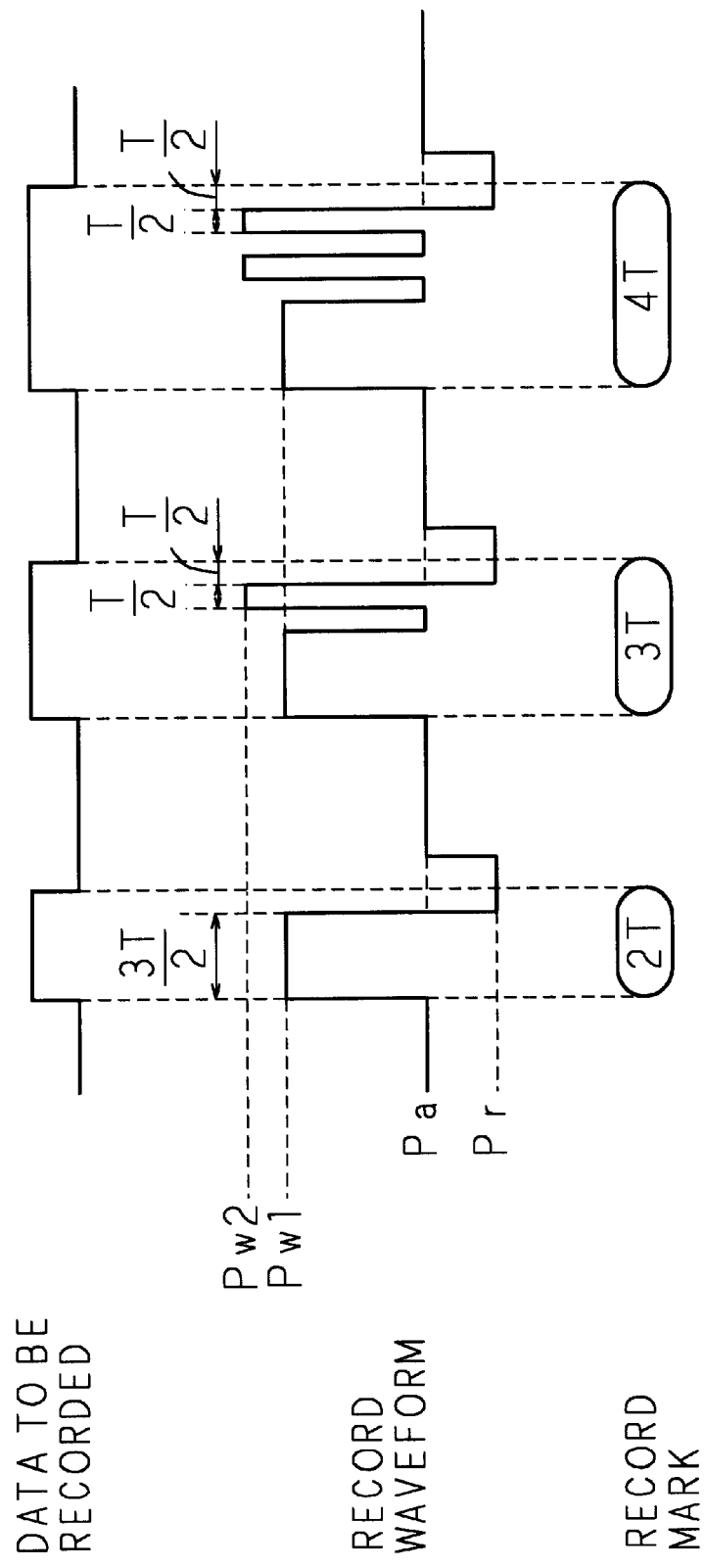
FIG. 1 is a timing chart showing a record waveform together with the data to be recorded in accordance with a prior art.
Figure 2:
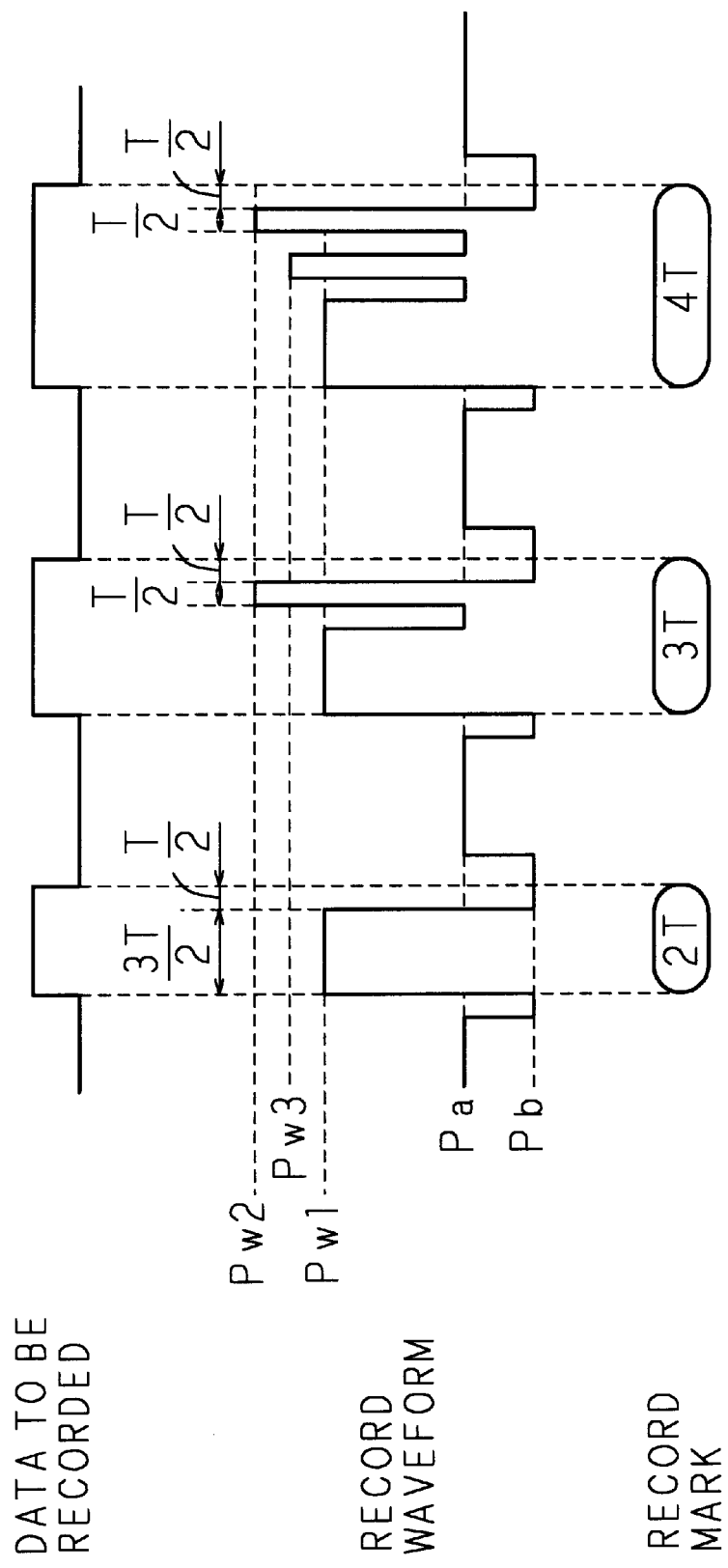
FIG. 2 is a timing chart showing a record waveform together with the data to be recorded in accordance with another prior art.
Figure 4:
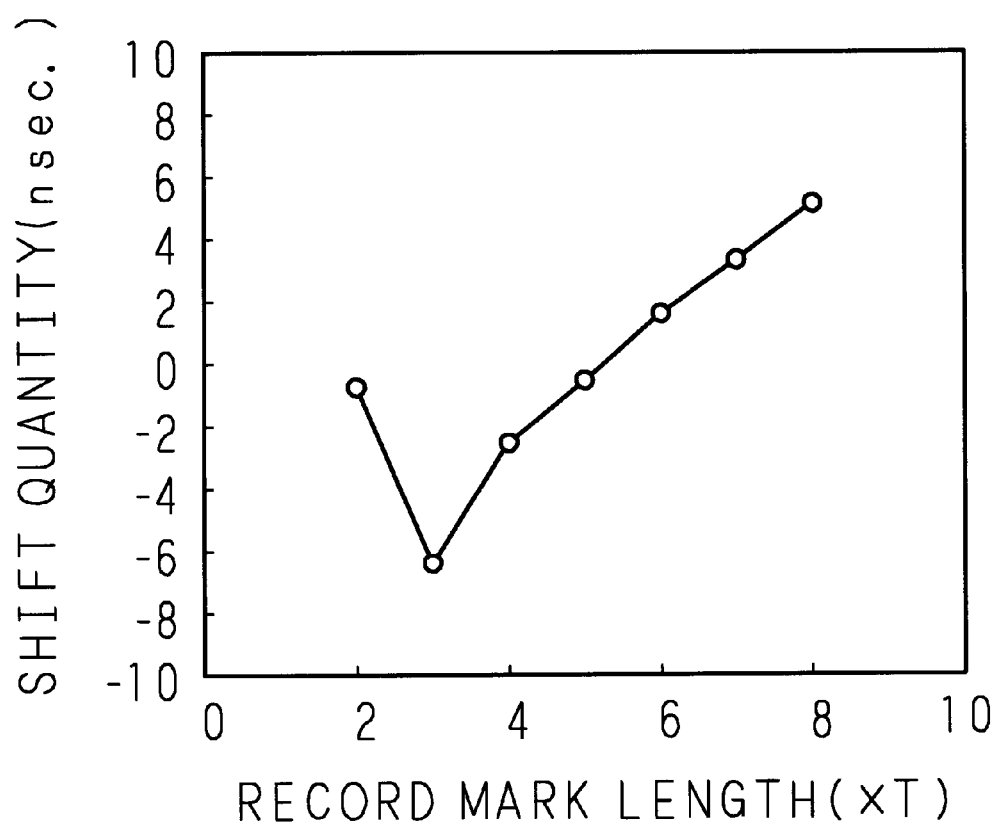
FIG. 4 is a graph showing the shift quantity in the length for each conventional mark recorded in a pattern-shift pattern.
Figure 5:
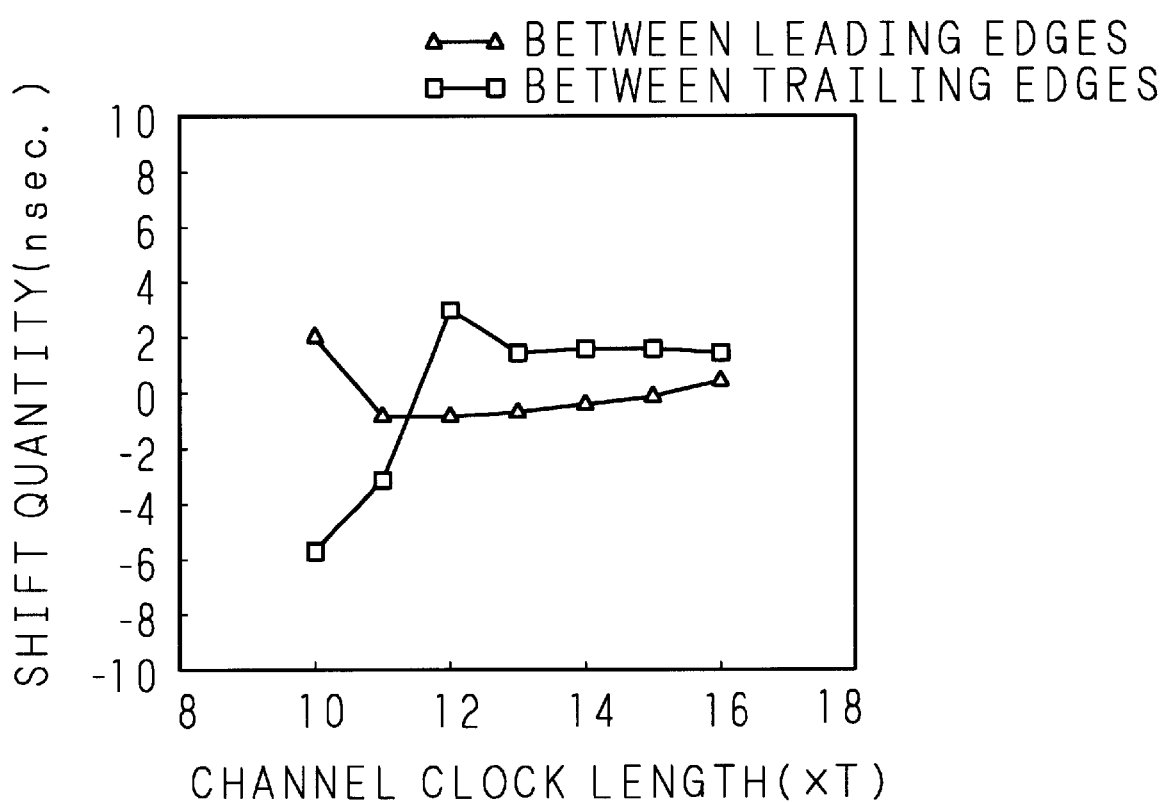
FIG. 5 is a graph showing the shift quantity of leading and trailing edges for each conventional mark similarly recorded in a pattern-shift pattern.
Figure 14:
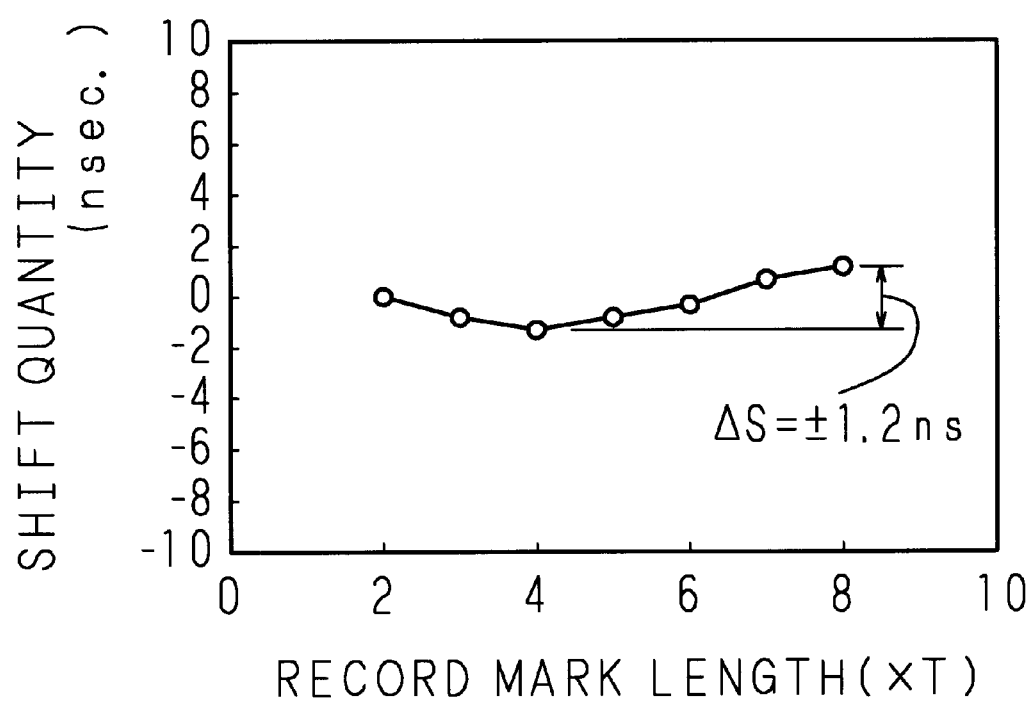
FIG. 14 is a graph showing the relation between the length and the shift quantity, of the record marks formed by an apparatus of the invention.

As such, record marks having a shortest length mark of 0.30 μm in (1, 7) RLL modulation code were formed both in the pattern-shift pattern and in the thermal shift pattern, and the pattern shift and the thermal shift were measured. FIG. 14 is a graph showing the relation between the length and the shift quantity, of the record marks formed by an apparatus of the present invention. The axis of ordinate indicates the pattern shift quantity (nsec.), and the axis of abscissa indicates the record mark length (×T). The T is 20 nsec. The recording compensation amount is 6% thereof, and hence the amount of timing adjustment is 1.2 nsec. As is seen from the graph, the shift quantity of 3T mark is smaller than that of the prior art (see FIG. 4), and the shift residue of record marks in accordance with the embodiment is ±1.2 nsec., which is far smaller than that of the prior art.

Figure 6:
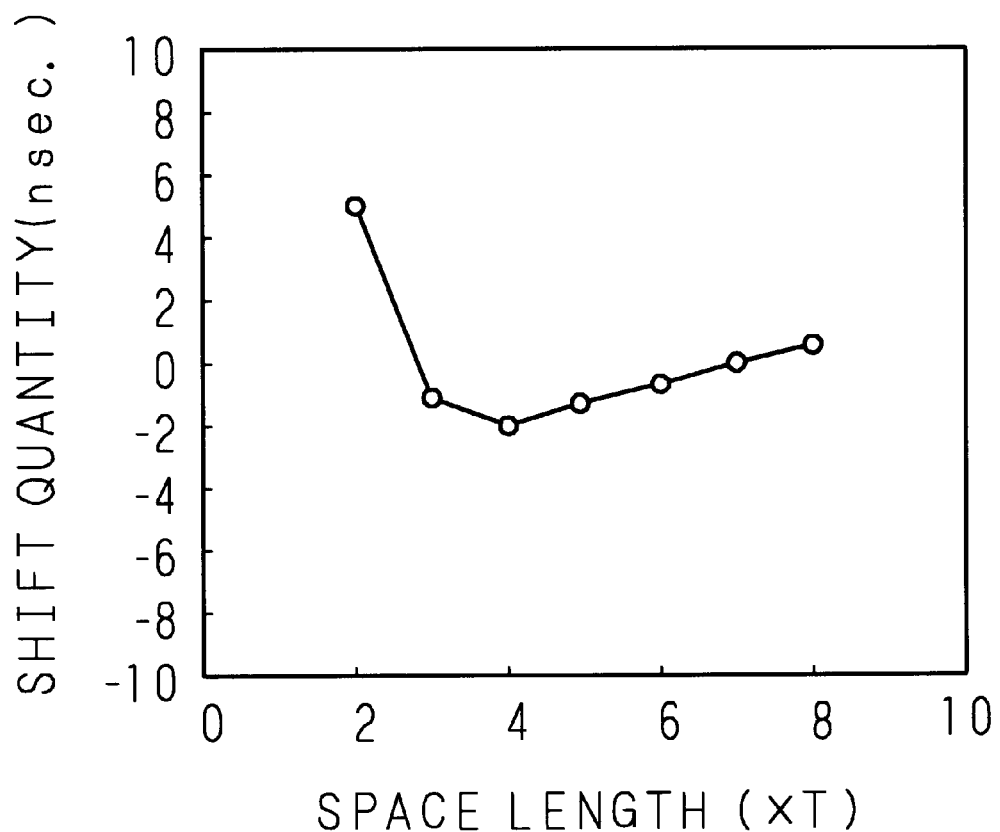
FIG. 6 is a graph showing the shift quantity in the space length between conventional marks recorded in a thermal shift pattern.
Figure 7:
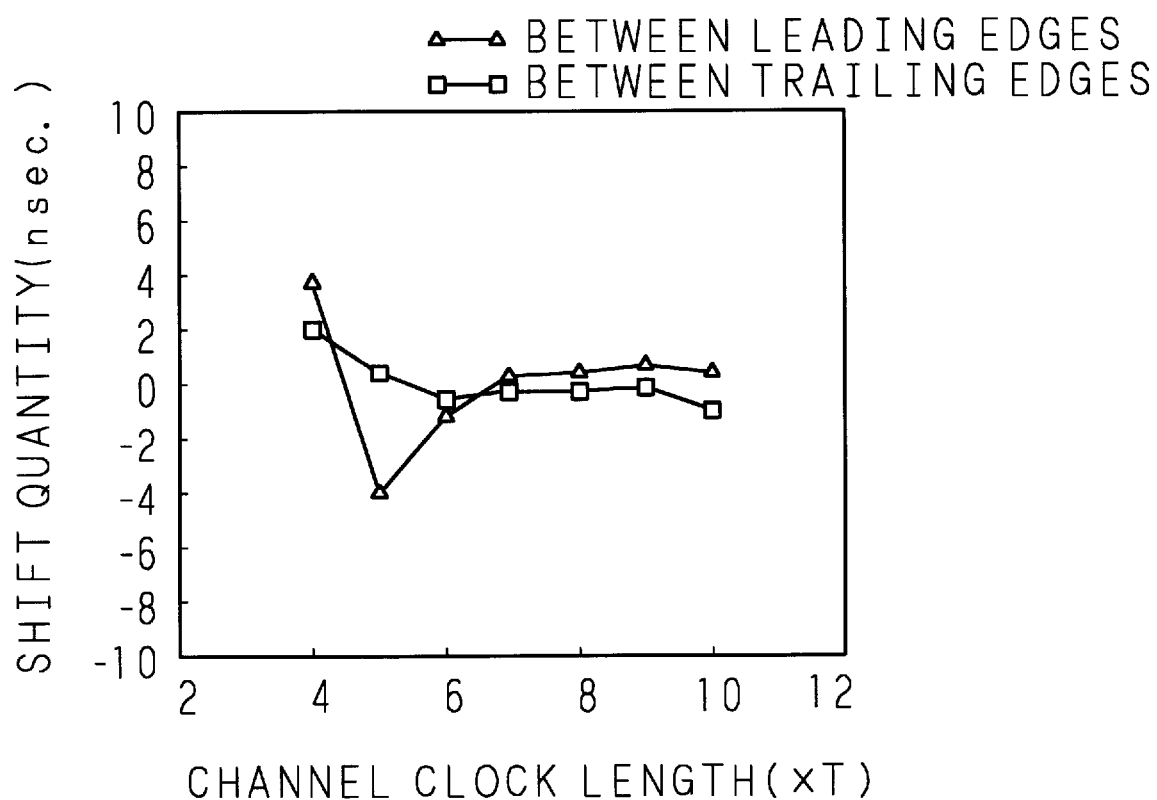
FIG. 7 is a graph showing the shift quantity of leading and trailing edges for each conventional mark recorded in a thermal shift pattern.
Figure 15:
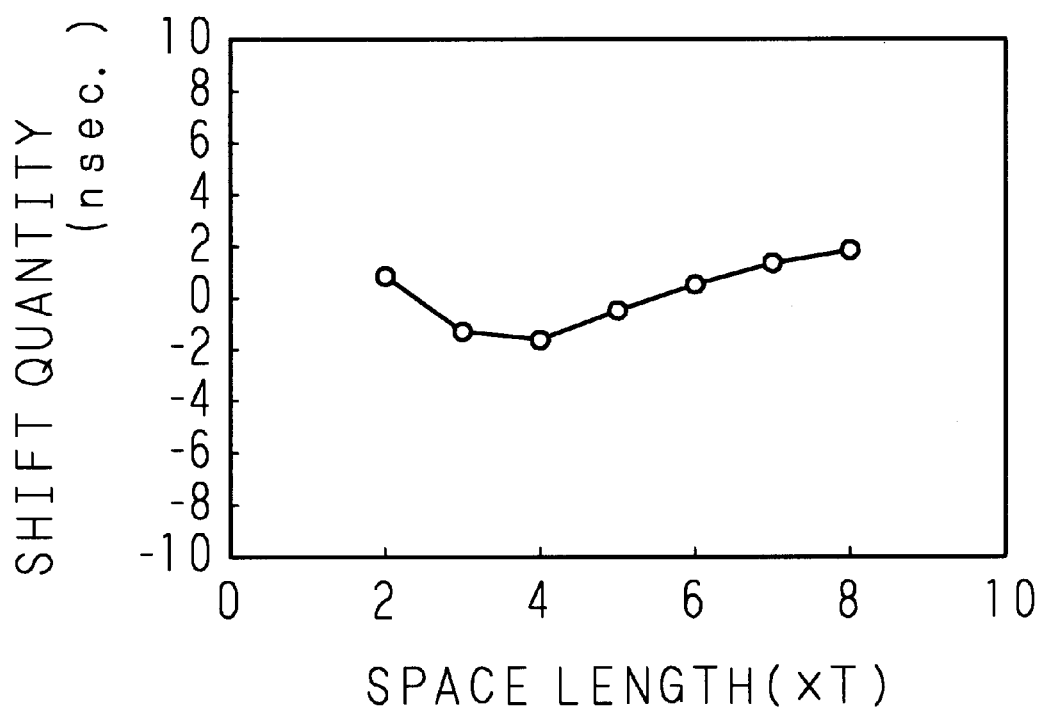
FIG. 15 is a graph showing the relation between the length and the shift quantity, of the spaces formed by an apparatus of the invention.
Figure 16:
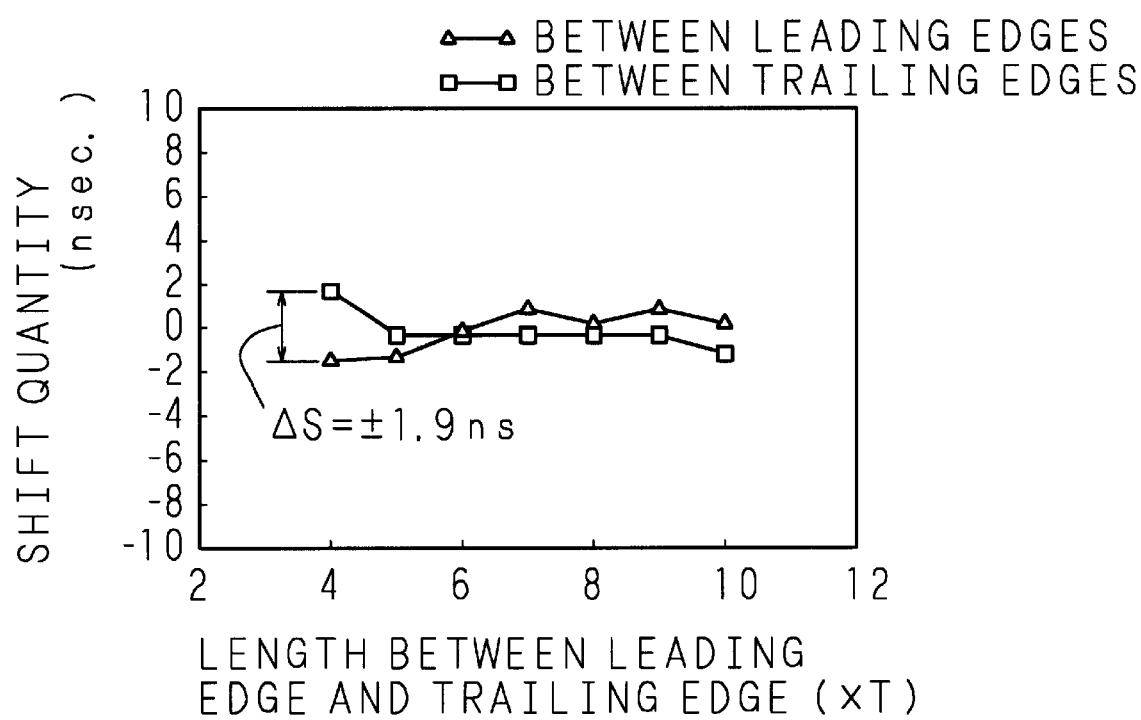
FIG. 16 is a graph showing the relation between the length between leading and trailing edges and the shift quantity, of the record marks formed by an apparatus of the invention.

FIG. 15 is a graph showing the relation between the length and the shift quantity, of the spaces formed by an apparatus of the present invention. The axis of ordinate of FIG. 15 indicates the thermal shift quantity (nsec.), and the axis of abscissa indicates the space length (×T). The T is 20 nsec. The recording compensation amount is 40% thereof, and hence the amount of timing adjustment is a delay of 8 nsec. As is seen from the graph, the shift quantity of 2T spaces is smaller than that of the prior art (see FIG. 6). Further, FIG. 16 is a graph showing the relation between the length between leading and trailing edges and the shift quantity, of the record marks formed similarly to FIG. 15. The axis of ordinate of FIG. 16 indicates the thermal shift quantity (nsec.), and the axis of abscissa indicates the length between the edges of record marks (×T). In the figure, the mark "Δ" indicates the data for leading edges, and the mark "□" indicates the data for trailing edges. As is seen from the graph, the shift quantity between leading edges at 5T in the axis of abscissa is smaller than that of the prior art (see FIG. 7), and the rearward shift of 3T marks has decreased. Further, the shift residue ΔS between the shift between leading edges and the shift between the trailing edges is 1.9 nsec., which is smaller than that of the prior art.

Figure 17:
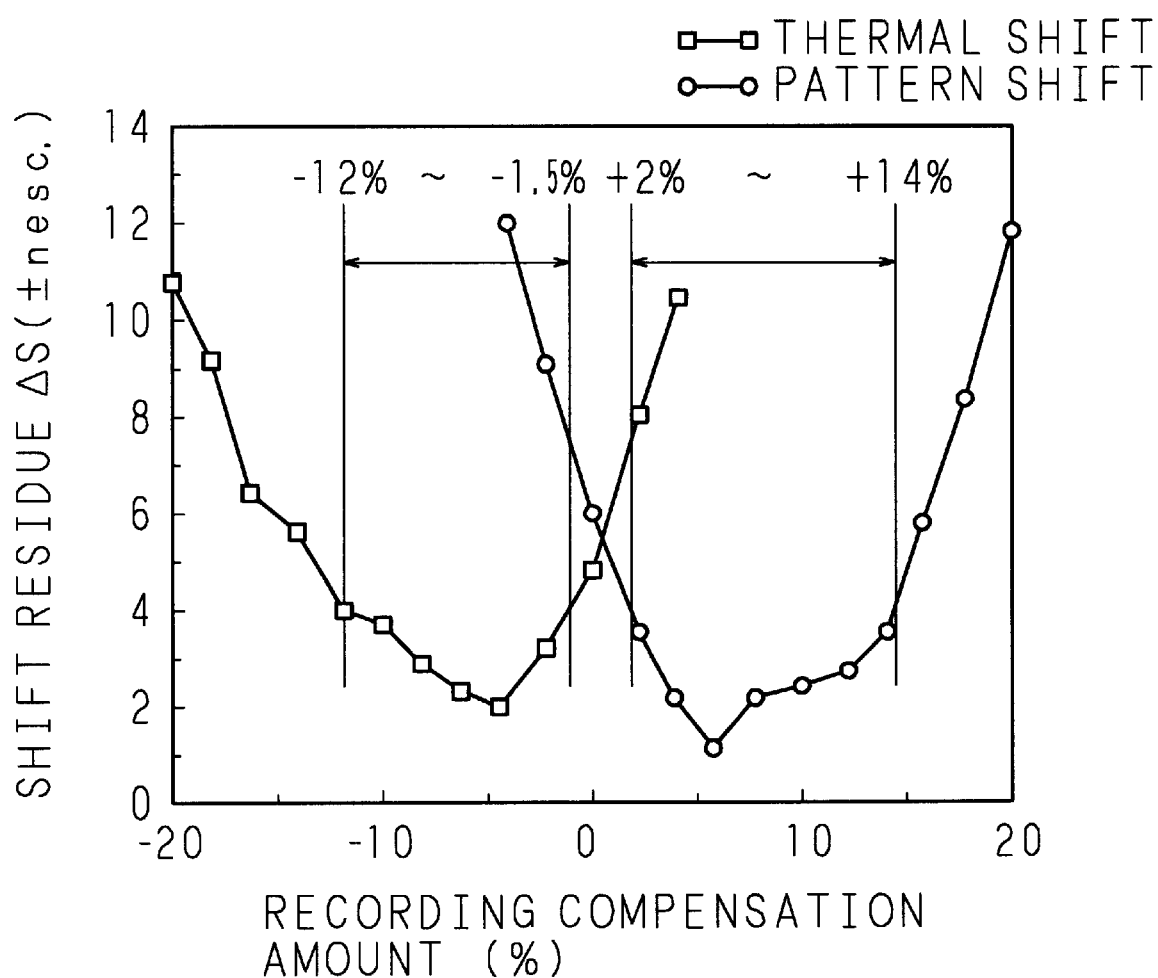
FIG. 17 is a graph showing the relation between the of recording compensation amount and the shift residue by a method of the invention.

Shift residue ΔS was measured for the record marks formed with different values of the recording compensation amount (amount of timing adjustment) by the above-mentioned recording method of the embodiment. FIG. 17 is a graph showing the relation between the recording compensation amount and the shift residue by the method of the invention. The axis of ordinate indicates the shift residue (±nsec.), and the axis of abscissa indicates the recording compensation amount (%). The positive direction of the recording compensation amount is the direction of delaying the timing and the negative direction of the recording compensation amount is the direction of advancing the timing. In the figure, the mark "□" indicates the shift residue of thermal shift, and the mark "□" indicates the shift residue of pattern shift. As is seen from the graph, the range of recording compensation having a shift residue ΔS of a tolerance (4 nsec.) or smaller for a T of 20 nsec. is from −12% to −1.5% for thermal shift and from 2% to 14% for pattern shift. Accordingly, in the timing adjustment in case of a T of 20 nsec., it is preferable to advance the pulse start timing by 1.5% to 12% of T and to delay the pulse termination timing by 2% to 14% of T.

As a result, in an information recording method of the embodiment, the positional shift quantity of leading and trailing edges can be reduced even for the formed marks having a fine dimension of 0.4 μm or less, whereby the jitter is reduced.

The description of the above-mentioned embodiment has been made for the case that the laser light power is modulated into four or five values in the formation of record marks and spaces. However, the present invention is not restricted to this. That is, the recording method of the invention is applicable to any multi-pulse method in which a record mark is formed by a pulse or a plurality of pulses of laser light. Further, the space length and the record mark length when the pulse timing adjustment is performed are not restricted to a 2T space and a 3T mark of (1, 7) RLL modulation code. That is, the adjustment of start timing may be performed at a mark following a shortest length space, and the adjustment of termination timing may be performed at a record mark the last pulse of which is the second pulse. In particular, the invention has a large effect when the adjustment of termination timing is applied to the case that a 3T mark of (1, 7) RLL modulation code is formed by the irradiation of two pulses.

The description of the above-mentioned embodiment has been made for the case that the data to be recorded is (1, 7) RLL modulation code. However, the present invention is not restricted to this. That is, a similarly effect can be obtained even for another modulation code when the pulse timing is adjusted for the "space, record mark" having a large shift.

Further, the description of the above-mentioned embodiment has been made for the case of magneto-optical recording in which a record mark is formed by the irradiation of light and the applying of a magnetic field. However, the present invention is not restricted to this. That is, the invention is applicable to any recording method using the irradiation of beam light, such as phase change type recording and write-once recording. Here, the phase change type recording is a recording method in which the recording film is changed between a crystal state and an amorphous state by the irradiation of beam light. The write-once recording is a recording method in which one-time-only writing is possible by making holes in a recording film of organic dye or metallic material by the irradiation of beam light.

Furthermore, the description of the above-mentioned embodiment has been made for the case that a record mark is formed on a magneto-optical recording medium capable of magnetic super-resolution reproduction. However, the present invention is not restricted to this. That is, a similarly effect can be obtained for any recording medium on which a record mark can be formed by the irradiation of light. In particular, the invention has a large effect for a magnetic super-resolution medium in which a record mark of a dimension smaller than the beam spot is recorded and reproduced.

As such, in the present invention, the pulse start timing and/or the pulse termination timing of beam light are adjusted during the recording of those permutational combinations of a space of a length and a mark of a length which cause a large shift quantity, whereby the positional shift quantity of leading and trailing edges is reduced even for the marks having a dimension of 0.4 μm or less, whereby the jitter is reduced. Further, in case that each record mark and each space are formed by the irradiation of power-modulated beam light pulsed into a pulse or a plurality of pulses, the start timing of the first pulse of a record mark formed following a shortest length space is advanced than the other start timing, whereby the forward shift quantity of record marks can be reduced. Further, the termination timing of the second pulse of a record mark requiring two pulses is delayed than the other termination timing, whereby the rearward shift quantity of record marks can be reduced. The present invention has such advantageous effects.

As this invention may be embodied in several forms without departing from the spirit of essential characteristics thereof, the present embodiment are therefore illustrative and not restrictive, since the scope of the invention is defined by the appended claims rather than by the description preceding them, and all changes that fall within metes and bounds of the claims, or equivalent of such metes and bounds thereof are therefore intended to me embraced by the claims.

What is claimed is:

1. An information recording method for recording the information on an optical medium by forming a series of record marks whose leading edge and the trailing edge correspond to one of the two values of binary information by means of irradiation of beam light pulsed into one or a plurality of pulse for each record mark, comprising the following steps:

determining the presence or absence of a permutational combination of a space of a predetermined length and a record mark of a predetermined length of inputted data to be recorded representing the record marks and the spaces to be formed;

instructing to, when the determination result is the absence of said predetermined permutational combination, perform the start of the first pulse for forming the objective record mark at a start timing set correspondingly to the timing of switching to the record mark of said data to be recorded, and to perform the termination of the last pulse for forming said record mark at a termination timing set correspondingly to the timing of switching to the space of said data to be recorded;

instructing, when the determination result is the presence of said predetermined permutational combination, timing the adjustment of advancing the start of the first pulse for forming a record mark of said predetermined length than said start timing and/or the adjustment of delaying the termination of the last pulse for forming the record mark of said predetermined length than said termination timing; and controlling the pulse timing of beam light from a light source in response to said instruction and thereby forming a record mark on said optical recording medium.

2. An information recording method as set forth in claim 1, wherein the presence or absence of said permutational combination including a record mark of a length requiring two pulses is determined in said determining step, and said method further comprising the step of instructing the adjustment of delaying the termination of the second pulse for forming the objective record mark than said termination timing when the determination result is the presence.

3. An information recording method as set forth in claim 1, wherein the presence or absence of said permutational combination including a shortest length space is determined in said determining step, and said method further comprising the step of instructing the adjustment of advancing the start of the first pulse for forming the objective record mark than said start timing when the determination result is the presence.

4. An information recording method as set forth in claim 3, wherein the presence or absence of said permutational combination including a record mark of a length requiring two pulses is determined in said determining step, and said method further comprising the step of instructing the adjustment of delaying the termination of the second pulse for forming the objective record mark than said termination timing when the determination result is the presence.

5. An information recording apparatus for recording information on an optical recording medium by forming a series of record marks whose leading edge and the trailing edge correspond to one of the two values of binary information by means of the irradiation of beam light pulsed into one or a plurality of pulse for each record mark, comprising:

a determining unit for inputting data to be recorded representing the record marks and the spaces to be formed, and for determining the presence or absence of a permutational combination of a space of a predetermined length and a record mark of a predetermined length;

an instructing unit for, when the determination result by said determining unit is the absence of said predetermined permutational combination, instructing to perform the start of the first pulse for forming the objective record mark at a start timing set correspondingly to the timing of switching to the record mark of said data to be recorded, and to perform the termination of the last pulse for forming said record mark at a termination timing set correspondingly to the timing of switching to the space of said data to be recorded;

a timing adjustment instructing unit for, when the determination result by said determining unit is the presence of said predetermined permutational combination, instructing the adjustment of advancing the start of the first pulse for forming a record mark of said predetermined length than said start timing and/or the adjustment of delaying the termination of the last pulse for forming the record mark of said predetermined length than said termination timing;

a light source capable of emitting pulsed beam light; and a beam light controlling unit for controlling the pulse timing of beam light from said light source in response to the instruction from said timing adjustment instructing unit.

6. An information recording apparatus as set forth in claim 5, wherein the start timing of said first pulse and the termination timing of said last pulse are set depending on a unit period defining the length of record marks and spaces to be formed, and the timing adjustment amount is set independently of said unit period.

7. An information recording apparatus as set forth in claim 5, wherein said beam light controlling unit is further capable of controlling the beam light power and thereby modulates the power value for forming the record marks and spaces.

8. An information recording apparatus as set forth in claim 5, wherein said determining unit determines the presence or absence of said permutational combination including a record mark of a length requiring two pulses, and said timing adjustment instructing unit instructs the adjustment of delaying the termination of the second pulse for forming the objective record mark than said termination timing when the determination result by said determining unit is the presence.

9. An information recording apparatus as set forth in claim 8, wherein the start timing of said first pulse and the termination timing of said last pulse are set depending on a unit period defining the length of record marks and spaces to be formed, and the timing adjustment amount is set independently of said unit period.

10. An information recording apparatus as set forth in claim 8, wherein said beam light controlling unit is further capable of controlling the beam light power and thereby modulates the power value for forming the record marks and spaces.

11. An information recording apparatus as set forth in claim 8, wherein said data to be recorded is (1, 7) RLL modulation code, and the record mark of a length requiring two pulses is a 3T mark (where T is a unit period).

12. An information recording apparatus as set forth in claim 11, wherein said determining unit determines the presence or absence of said permutational combination including a shortest length space, and said timing adjustment instructing unit instructs the adjustment of advancing the start of the first pulse for forming the objective record mark than said start timing when the determination result by said determining unit is the presence.

13. An information recording apparatus as set forth in claim 12, wherein the start timing of said first pulse and the termination timing of said last pulse are set depending on a unit period defining the length of record marks and spaces to be formed, and the timing adjustment amount is set independently of said unit period.

14. An information recording apparatus as set forth in claim 12, wherein said beam light controlling unit is further capable of controlling the beam light power and thereby modulates the power value for forming the record marks and spaces.

15. An information recording apparatus as set forth in claim 12, wherein said determining unit determines the presence or absence of said permutational combination including a record mark of a length requiring two pulses, and said timing adjustment instructing unit instructs the adjustment of delaying the termination of the second pulse for forming the objective record mark than said termination timing when the determination result by said determining unit is the presence.

16. An information recording apparatus as set forth in claim 15, wherein the start timing of said first pulse and the termination timing of said last pulse are set depending on a unit period defining the length of record marks and spaces to be formed, and the timing adjustment amount is set independently of said unit period.

17. An information recording apparatus as set forth in claim 15, wherein said beam light controlling unit is further capable of controlling the beam light power and thereby modulates the power value for forming the record marks and spaces.

18. An information recording apparatus as set forth in claim 15, wherein said data to be recorded is (1, 7) RLL modulation code, and the record mark of a length requiring two pulses is a 3T mark (where T is a unit period).

19. An information recording apparatus as set forth in claim 12, wherein said data to be recorded is (1, 7) RLL modulation code, and the shortest length space is a 2T space (where T is a unit period).

* * * * *